US012807263B2

(12) United States Patent
Storvestre

(10) Patent No.: US 12,807,263 B2
(45) Date of Patent: Nov. 24, 2026

(54) FOUR-WHEEL DRIVEN, ALL-TERRAIN VEHICLE

(71) Applicant: Exotek AS, Stordal (NO)

(72) Inventor: Mattias Storvestre, Fagerstrand (NO)

(73) Assignee: Exotek AS, Stordal (NO)

( * ) Notice: Subject to any disclaimer, the term of this patent is extended or adjusted under 35 U.S.C. 154(b) by 297 days.

(21) Appl. No.: 18/709,547

(22) PCT Filed: Nov. 11, 2022

(86) PCT No.: PCT/NO2022/050256

§ 371 (c)(1),
(2) Date: May 13, 2024

(87) PCT Pub. No.: WO2023/085949

PCT Pub. Date: May 19, 2023

(65) Prior Publication Data

US 2025/0010936 A1 Jan. 9, 2025

(30) Foreign Application Priority Data

Nov. 12, 2021 (NO) .................................... 20211370

(51) Int. Cl.

*B62K 5/003* (2013.01)
*B62K 5/08* (2006.01)
*B62K 5/00* (2013.01)

(52) U.S. Cl.

CPC ................ *B62K 5/003* (2013.01); *B62K 5/08* (2013.01); *B62K 2005/001* (2013.01)

(58) Field of Classification Search

CPC ..... B62K 5/003; B62K 5/08; B62K 2005/001
See application file for complete search history.

(56) References Cited

U.S. PATENT DOCUMENTS 7,618,063 B2 11/2009 Takeshima et al.
7,648,148 B1 * 1/2010 Mercier .................. B62K 5/05 280/5.509
7,922,184 B2 4/2011 Porcheron
8,070,172 B1 * 12/2011 Smith ...................... B62K 5/05 280/124.135
8,585,068 B2 11/2013 Schlangen et al.
8,764,040 B1 7/2014 DeLauter (Continued)

FOREIGN PATENT DOCUMENTS

CN 201235854 Y 5/2009
CN 107628180 A 1/2018

(Continued)

OTHER PUBLICATIONS

International Search Report and Written Opinion mailed Feb. 27, 2023 for International Patent Application No. PCT/NO2022/050256.

(Continued)

*Primary Examiner* — Edwin A Young
(74) *Attorney, Agent, or Firm* — Alix, Yale & Ristas, LLP

(57) ABSTRACT

A four-wheel driven vehicle capable of all terrain use and which is particularly suitable for people with reduced physical ability has a frame with various arms, connections and suspension elements that assist the capability of use off-road or on trails and paths with uneven ground. The vehicle can be classified as a wheel chair according to national requirements and standards.

15 Claims, 13 Drawing Sheets

(56) References Cited

U.S. PATENT DOCUMENTS

| | | | | |
|---|---|---|---|---|
| 2005/0178603 | A1* | 8/2005 | Takeshima | B62K 5/01 180/311 |
| 2005/0257989 | A1 | 11/2005 | Iwami et al. | |
| 2006/0006623 | A1* | 1/2006 | Leclair | B62D 7/18 280/124.136 |
| 2007/0096418 | A1 | 5/2007 | Houser et al. | |
| 2007/0193813 | A1 | 8/2007 | Schlangen et al. | |
| 2013/0175779 | A1* | 7/2013 | Kvien | B62D 21/183 280/124.15 |
| 2017/0088231 | A1 | 3/2017 | Williams et al. | |

FOREIGN PATENT DOCUMENTS

| | | | |
|---|---|---|---|
| JP | 2006256580 | A | 9/2006 |
| TW | 590560 | U | 2/2020 |
| WO | 2016205865 | A1 | 12/2016 |

OTHER PUBLICATIONS

Written Opinion mailed Oct. 17, 2023 for International Patent Application No. PCT/NO2022/050256.
International Preliminary Report on Patentability dated Mar. 1, 2024 for International Patent Application No. PCT/NO2022/050256.
Norwegian Search Report dated Jun. 9, 2022 for Norwegian Patent Application No. 20211370.
Office Action dated Jul. 11, 2023 for Norwegian Patent Application No. 20221338.
Extended European Search Report dated May 18, 2026 for European Patent Application No. 25225100.4.

* cited by examiner

FOUR-WHEEL DRIVEN, ALL-TERRAIN VEHICLE

BACKGROUND

The disclosed embodiments relate to a four-wheel driven, all-terrain vehicle which is particularly suitable for people with reduced physical ability (physical disablement). The embodiments are also intended for use off-road or on trails and paths with uneven ground and at the same time can be classified as a wheel chair according to national requirements and standards.

People with reduced physical ability (physical disablement) should be able to benefit from all the experiences in nature which is available around us in the same way as people without physical disabilities. Today, people with reduced physical ability (physical disablement) have limited opportunities for moving around outdoors in the woods and fields on their own. Wheel chairs and vehicles for disabled people are usually made to be used on even ground and creates problems for the user as soon as there are small obstacles, such as kerbstones, stairs and the like, and can for all practical purposes not be used in more rugged ground such as on trails where obstacles in the form of stones, roots and similar are found.

The products that are available in the market today, which are meant to be used in rough terrain have their limitations in passing vertical obstacles because of their spring geometry of the wheel suspensions. They also have outer dimensions, one or more, which fall outside the criteria given in order to be defined as a wheel chair in many countries, including Norwegian requirements in the traffic rules (as per 2021) and the European standard NS-EN 12184:2014. Subsidy schemes, which are available in Norway through the well fare system for people with reduced physical ability (physical disablement), require that the vehicle is defined as a wheel chair according to the traffic rules in order to be redeemed.

In the international patent application WO 2015/166241 A1 there is described a four-wheel bike for disabled which can be driven manually. An embodiment is related to a four-wheel drive bike with gravity propulsion where the spring geometry and the attachment points of the spring components can improve the driving dynamics. The disadvantage of such all-terrain vehicles is that they can only be used in downhill and must be brought back via another assisting means and is as such only practical for use in areas which are specially adapted for leisure activities.

On the internet there are several web pages which show vehicles for travel in terrain. For example, on the web page https://www.ev4.pl/en/mountain-cart.html, which show electric four-wheel driven vehicles for travel in the terrain. Another example can be found on the web page https://www.cyclonemobility.com/products/bowhead-reach-e-bike/, which show electric off-road vehicles.

SUMMARY

The disclosed embodiments generally solve one or several of the problems of existing prior art.

More specifically, provided herein is a more effective terrain-travelling vehicle.

Also provided is a terrain-travelling vehicle which can pass obstacles found in the terrain in an effective way.

Also provided is a terrain-travelling vehicle which can safely make its way on steep slopes.

Also provided is a terrain-travelling vehicle which is safe to use for physically disabled people who are not capable of saving themselves out of situations where the vehicle is stuck.

Also provided is a terrain-travelling vehicle for physically disabled people which, in addition to being safe to use, also satisfies requirements to such vehicles in today's standards.

Hence, there is provided a four-wheel driven, all-terrain vehicle comprising a frame which is provided with a bracket device, which frame further comprises:

- a right front wheel suspension and a left front wheel suspension with a right front wheel and a left front wheel respectively, and
- a right rear wheel suspension and a left rear wheel suspension with a right rear wheel a left rear wheel respectively, wherein
- the right front wheel suspension comprises a right, upper, front control arm which is shaped as an A-arm and is connected to the frame with a right, upper, front connecting connection and a right, upper, rear connecting connection,
- the right front wheel suspension further comprises a right, lower, front control arm which is shaped as a curved A-arm and is connected to the frame with a right, lower, front connecting connection and a right, lower, rear connecting connection,
- the left front wheel suspension comprises a left, upper, front control arm which is shaped as an A-arm and is connected to the frame with a left, upper, front connecting connection and left, upper, rear connecting connection,
- the left front wheel suspension further comprises a left, lower, front control arm which is shaped as a curved A-arm and is connected to the frame with a left, lower, front connecting connection and a left, lower, rear connecting connection, and wherein

- the right, upper, front connecting connection is connected to the frame vertically higher than the right, upper rear connecting connection such that the right, upper, front control arm is inclined relative to a horizontal plane,
- the right, lower, front connecting connection is connected to the frame vertically higher than the right, lower rear connecting connection such that the right, lower, front control arm is inclined relative to a horizontal plane,
- the left, upper, front connecting connection is connected to the frame vertically higher than the left, upper rear connecting connection such that the left, upper, front control arm is inclined relative to a horizontal plane, and
- the left, lower, front connecting connection is connected to the frame vertically higher than the left, lower rear connecting connection such that the left, lower, front control arm is inclined relative to a horizontal plane.

The front wheel suspensions on a all-terrain going vehicle, as defined above, provides a spring geometry which enables the vehicle to pass over vertical obstacles in nature. The outer dimensions of the vehicle, such as maximum length and width, can satisfy the existing national requirements and rules of individual countries, such as Norway, for vehicles for physically disabled people.

In an embodiment, the upper and lower, front control arms are preferably inclined relative to a horizontal plane such that they form an angle which is larger than 0 degrees, between the upper and lower, front control arms and a horizontal plane. Such an angle is usually called a kick-up angle.

In an embodiment the upper and lower, front control arms preferably have the same kick-up angle of around 15 degrees, but it may lie in the range of 15-30 degrees. In another embodiment the upper and lower, front control arms are preferably provided with individual adjustment of the kick-up angle to improve the driving properties of the vehicle.

A kick-up angle gives the vehicle better properties to pass obstacles, mainly vertical obstacles, and gives the vehicle the potential to pass over higher obstacles than without the kick-up angle. The upper and lower, front control arms with the kick-up angle, move aslant backward towards the driver when impacting an obstacle and the vehicle starts to climb over the obstacle. Another advantage of a positive kick-up angle is that it provides a softer impact when an obstacle hits the front wheel from the front.

In an embodiment, the upper, front control arms are preferably attached to the frame in the vicinity of the longitudinal centre line of the frame. For example, the upper, front control arms may be attached 37.5 mm from the longitudinal centre line, but preferably not more than 100 mm from the longitudinal centre line of the frame. The upper, front control arms preferably have a shortest length of 175 mm. In a preferred embodiment the upper, front control arms have a length of 273 mm. Such an embodiment provides longer control arms without increasing the width of the vehicle.

In an embodiment, the lower, front control arms, are preferably both curved A-arms. The lower, front control arms preferably extend from two connecting connections on the frame and substantially horizontally up to the lower, outer edge of the frame, at the left and right side of the frame respectively, and then curving in an arc over and down past the pipe elements of the frame and down to respective connecting connections on the lower part of the front link elements. With this design of the lower, front control arms they can move vertically without coming into conflict with the frame.

In an embodiment where the left, lower front connecting connection for the two lower, front control arms on the frame is in the region of the longitudinal centre line of the frame, preferably 17.5 mm from the longitudinal centre line, but not more than 80 mm from the longitudinal centre line of the frame. This is to obtain as long control arms as the frame geometry allows without increasing the width of the vehicle. The lower, front control arms have a length of at least 250 mm, but with a preferred length of 330 mm.

The advantage of having the connecting connections of the front control arms so close to the longitudinal centre line of the frame is to improve the ratio between the width length of the of the vehicle and the length of the control arms. The longer control arms that the vehicle has, the better spring properties the vehicle will have, which in turn provides better driving qualities in uneven terrain.

In an embodiment, the four-wheel driven, all-terrain vehicle may be designed such that:

- the right, rear wheel suspension comprises a right, lower, rear control arm which is formed as an A-arm, and a right, upper camber link, where the right, upper camber link extends between and is connected to the bracket device and the link arm, and In an embodiment, the four-wheel driven, all-terrain vehicle may be designed such that:

- the right rear wheel suspension comprises a right, lower, rear control arm which is shaped as an A-arm and a right, upper camber link, where the right, upper camber link extend between, and is connected to, the bracket device and a right, rear, link element, and
- the left rear wheel suspension comprises a left, lower, rear control arm which is shaped as an A-arm and a left, upper camber link, where the left, upper camber link extend between, and is connected to, the bracket device and a left, rear, link element.

There is also provided a four-wheel driven, all-terrain vehicle comprising a frame which is provided with a bracket device, which frame further comprises:

- a right front wheel suspension and a left front wheel suspension with a right front wheel and a left front wheel respectively, and
- a right rear wheel suspension and a left rear wheel suspension with a right rear wheel and a left rear wheel respectively, wherein

- the right rear wheel suspension comprises a right, lower, rear control arm which is shaped as an A-arm and a right, upper camber link, where the right, upper camber link extend between, and is connected to, the bracket device and a right, rear, link element.

In an embodiment of the two alternatives the lower, rear control arms are preferably attached to the frame with two connecting connections to the frame, one front and one rear connecting connection for each of the two control arms, with a distance of at least 250 mm between them in the longitudinal direction of the frame, and a connecting connection to the link element. The lower, rear control arms are shaped as A-arms.

In an embodiment of the two alternatives the front and rear connecting connection of the lower, rear control arms of the frame are preferably arranged in a distance of up to 80 mm from the longitudinal centre line of the frame, preferably 15 mm from the centre line. With this position of the connecting connections the length of the control arms are made as large as the frame geometry allows without increasing the width of the vehicle.

In an embodiment of the two alternatives the lower, rear control arms preferably have a length of between 250 mm and 350 mm, measured from a line between the connecting connections on the frame and perpendicularly out to the connecting connections on the link element.

In an embodiment of the two alternatives the right, lower, rear control arm is preferably connected to the frame with a right, rear, lower, front connecting connection and a right, rear, lower, rear connecting connection, and where the right, rear, lower, front connecting connection is connected to the frame vertically higher than the right, rear, lower, rear connecting connection, such that the right, lower, rear control arm is inclined relative to a horizontal plane, and the left, lower, rear control arm is preferably connected to the frame with a left, rear, lower, front connecting connection and a left, rear, lower, rear connecting connection, and where the left, rear, lower, front connecting connection is connected to the frame vertically higher than the left, rear, lower, rear connecting connection, such that the left, lower, rear control arm is inclined relative to a horizontal plane.

In an embodiment the lower, rear control arms are preferably arranged aslant relative to a horizontal plane, such that they form an angle between the lower, rear control arm and a horizontal plane which is larger than 0 degrees. Such an angle is usually called anti-squat in the technical terminology.

In another embodiment of the two alternatives the vehicle preferably has an anti-squat angle of at least 2 degrees, preferably 5 degrees. The vehicle will then obtain a better grip of the front wheels in an acceleration, which gives a better practicability in the terrain. Anti-squat also provides the vehicle with a better grip for the rear wheels in the terrain when braking which in turn increases the safety of the driver.

In an embodiment of the two alternatives, the right, rear wheel suspension and the left, rear wheel suspension preferably each has its upper camber link which is attached to the frame via the bracket device and each to a respective link element. The camber link is preferably a rod with an adjustable length, but it may also be a rod with fixed length.

All connecting connections to the two alternatives are preferably a type of a ball joint coupling, but one or several or all the connecting connections may alternatively be a link coupling and/or a ball-and-socket joint and/or a pivot joint and/or other devices that are suitable as a connecting connection.

In an embodiment of the two alternatives the right, upper, front control arm and the right, lower, front control arm is preferably connected to a right, front link element which is further connected to a right, front wheel hub and where the longitudinal axis of the right, front link element forms a positive caster angle, and where the left, upper, front control arm and the left, lower, front control arm is connected to a left, upper, front control arm and the left, lower, front control arm are connected to a left, front link element which is further connected to a left, front wheel hub and where the longitudinal axis of left, front link element forms a positive caster angle.

The caster angle should be understood such that it is the angle between the vertical axis of the link element and the longitudinal axis of the link element. The caster angle is positive when the longitudinal axis of the link element meets the ground/road surface in front of the vertical axis of the link element.

In another embodiment of the two alternatives the vehicle preferably has a positive caster angle of at least 5 degrees, and preferred of 15 degrees. Such a caster angle will provide a better directional stability while at the same time making the front wheels to straighten up after a curve.

The four-wheel driven, all-terrain vehicle according to claim 2, wherein the right, upper camber link and the left, upper camber link are adjustable for individual adjustment of a camber angle.

Front wheels with a positive caster angle also lean inwards in the same way as when one leans in a curve when bicycling or driving a motorbike such that the stability and the grip is improved, which in turn improves the practicability in the terrain and improves the safety for the driver of the vehicle.

In an embodiment of the two alternatives the right, upper camber link and the left, upper camber link are preferably adjustable for individual adjustment of the camber angle.

The camber angle is the angle between the centre axis of the wheel relative to the vertical axis of the wheel when seen from the front or the rear of the vehicle. If the bottom of the wheel is further away from the longitudinal axis of the vehicle than the top of the wheel, it can be said to have a negative camber angle. If the top of the wheel is further away from the longitudinal axis of the vehicle than the bottom of the wheel, it can be said to have a positive camber angle. A wheel which is completely vertical will have a camber angle of zero degrees.

The advantage of having a negative camber angle on a vehicle is to increase the stability of the vehicle, especially in a curve, and especially important in a curve at high speed. On the other hand, with a negative camber angle the curving resistance. The all-terrain vehicle disclosed herein may therefore advantageously be provided with a little positive camber angle in order to reduce the effort to turn the vehicle and thereby increase the practicability in uneven terrain.

In an embodiment of the two alternatives, the right front wheel suspension is provided with a right, front damping device and the left front wheel suspension is provided with a left, front damping device, where the right, front damping device is attached to the frame and either the right, upper, front control arm or the right, lower, front control arm, and the right, front damping device is attached to the frame and either the right, upper, front control arm or the right, lower, front control arm.

In a further embodiment of the two alternatives, the right rear wheel suspension is preferably provided with a right, rear damping device which is attached to the bracket device and the right, lower, rear control arm, and wherein the left rear wheel suspension is preferably provided with a left, rear damping device which is attached to the bracket device and the left, lower, rear control arm.

In an embodiment of the two alternatives, the vertical spring suspension is preferably at least 150 mm, at preferred at least 190 mm, for better practicability and driving properties in uneven terrain.

In an embodiment of the two alternatives, the damping devices are preferably a combination of hydraulic damping and a mechanical spring, such as a helical springs or leaf springs. Alternatively, pneumatic damping may used or a combination of these such that the damping devices can function as springing and damping for the vehicle.

In an embodiment of the two alternatives, the position of the two front damping devices for the front wheel suspensions are preferably arranged such that they do not come into conflict with the driver's leg placements, i.e. in a way such that the driver can place his or her legs below the upper, front control arms and above the lower, front control arms.

In an embodiment of the two alternatives, both front wheels are preferably each provided with its propulsion device for individual drive of the front wheels, and both rear wheels are each provided with its propulsion device for individual drive of the back wheels.

It is an advantage to provide each of the wheels with a propulsion device such that the vehicle gets a better practicability in uneven terrain and the vehicle then does not need a differential lock since there is no drive line between the wheels.

In an embodiment of the two alternatives, the front wheels and/or the rear wheels are preferably provided with over-dimensioned tyres (ie. fat-bike wheels).

The advantage with over-dimensioned tyres, typically 3,7" or larger, is that they are developed for driving on soft and unstable terrain, such as snow or sand, but is also very suitable for deep mud and driving which is considered to be normal driving in the terrain. Over-dimensioned tyres provide a larger carrying capacity, inflict less damage to the nature, provide better grip and traction and provide extra damping for increased comfort and reduced impact from impacts and shocks from rugged terrain.

In an embodiment, the steering column is preferably arranged in a substantially vertical position and is connected to the frame above the position of the legs of a driver, and a steering bracket is preferably connected to the steering column and a position damping device is connected to the frame and the steering bracket.

The position damping device is preferably a device for the steering device to make it easier to hold the steering device stable in a given position. At an impact or a shock to the front wheels the position damping device will dampen the excursion which affects the direction and it will be easier for the driver to keep control of the steering. The position damping device will also function as an end stop for the front wheels so that they don't come into conflict with the frame in a sharp curve.

In an embodiment of the two alternatives, the position damping device for the steering device preferably comprises a hydraulic damping device. Alternatively, the position damping device may comprise a helical spring, a rubber device or a pneumatic device.

In an embodiment of the two alternatives, the right tie rod is preferably connected to the steering bracket and the right tie rod bracket and a left tie rod is preferably connected to the steering bracket and the left tie rod bracket, and where the right and left tie rods are preferably arranged in a substantially horizontal position above the leg placement of the driver.

The advantage of having the leg placement of the driver below the steering column which is connected to the steering bracket comprising the tie rods, as well as the upper, front control arm, is that that such a design reduces the total length of the vehicle as compared to if the leg placement is behind the steering column with a large steering bracket and tie rods.

In an embodiment of the two alternatives, the steering column is preferably substantially vertically arranged or slightly inclined backward towards the driver when the vehicle is arranged on a horizontal ground such that the steering device is arranged in a plane that is substantially horizontal when the steering device is turned about the longitudinal axis of the steering column. The steering device is preferably normal handlebars, but may also be a steering wheel, a joystick, a handle or another adapted steering device for drivers with reduced physical abilities.

The advantage with such an embodiment is that one avoids impacts between the steering device and the legs of the driver when going through a curve, i.e. the steering device is turned. Drivers having legs with reduced functional ability or no functional ability, will not be able to move the legs while passing through a curve if the steering device should come into conflict with the positioning of the legs, and it is therefor an advantageous feature that the steering device can be kept in a horizontal plane when turning.

In an embodiment of the two alternatives, the frame is made of pipe elements and the frame is designed such that the pipe elements can be used as a grab handle during transfer in and out of a seat for drivers with reduced physical ability. The pipe elements can extend downwards along each side, or horizontally as an armrest of the seat and can be used when moving into and out of the seat. It is also possible to connect auxiliary equipment to the pipe elements, such as other aiding devices for the movement of the driver or positioning in the seat, or other types of auxiliary equipment such as storing space, brackets for luggage, charging cable, cup holder etc.

In an embodiment of the two alternatives, the vehicle is preferably a wheel chair for drivers with reduced physical ability. The term wheel chair does not have common, global definition and the vehicle must be adapted to national laws and standards which are implemented for wheel chair in the respective countries, or states, where the vehicle is sold or marketed as an electric, four-wheel driven all-terrain wheel chair.

The requirements to the dimensions and speed of wheel chairs in Norway is given in the Norwegian traffic rules § 1, No. 1 with letter I(L). These requirements are:

maximum width is 850 mm,
maximum length is 1800 mm, and
maximum weight is 250 kg, and
maximum speed is 15 km/h.

In addition to these requirements, NS-EN 12184:2014 is also applicable to electrically driven wheel chairs.

In an embodiment of the two alternatives, the vehicle preferably satisfies one or more of the requirements to motorized and/or electric wheel chairs according the requirements and standards in force.

In an embodiment of the two alternatives, the vehicle is preferably an electric vehicle. The propulsion device is preferably an electric motor, but may also be a petrol, diesel, hydraulic or pneumatic motor. The vehicle may also be used without a motor where the vehicle is moved via added pushing power and/or via gravitational propulsion downhill.

In an embodiment of the two alternatives, the vehicle is preferably provided with a rollover bar and seat belts to protect the driver. The rollover bar may be detachable, in order to reduce the size of the vehicle in connection with transport and storage.

The seat belts may be designed for driver with reduced physical ability (physical disability), where the functioning of the seat belts is not only for safety during an impact, but also to keep legs, arms and upper part of the body or other parts of the body stable enough for the driver to steer and control the vehicle in a safe way.

In an embodiment of the two alternatives, the all-terrain vehicle is preferably provided with one or more brake devices for the wheels. The brake devices preferably comprise brake discs and brake pads, but may also comprise another type of suitable brake devices for such a vehicle.

The brake device in front is preferably connected such that a left handle and/or a left pedal works on both front wheels and the rear brake device is preferably connected such that a right handle and/or pedal works on both rear wheels.

In an embodiment of the two alternatives, the all-terrain vehicle is preferably provided with a control system which comprises a display to show the driver data such as battery status, speed, gear-indication, error messages, but also other parameters such as gps-position, route plan, charging plan, clock etc. The driver will thereby get safer experience and it makes the planning of drives much easier.

In a further embodiment of the two alternatives, the all-terrain vehicle is preferably arranged such that the driver has speed control and gear shift on the steering device of the vehicle in the form of handles or buttons.

BRIEF DESCRIPTION OF THE DRAWINGS

Non-limiting embodiments of the present invention will now be described in more detail with reference to the attached figures, where.

DETAILED DESCRIPTION

FIGS. 1-12 shows an embodiment of an all-terrain vehicle. On FIG. 1 the all-terrain vehicle is seen aslant from the front, where it is clearly shown how the front wheels lean when the steering device is turned. The top of the front wheels leans inwards against the turning radius, which is then coincident with the direction of the steering wheel. This is one of the advantages of having a positive caster angle and which provides a better turning radius than if the wheels had been arranged vertically in a curve. It can also be seen from the figure that the wheels have over-dimensioned tyres (i.e. fat-bike wheels) which provides improved properties for driving on soft ground and not least in rugged terrain.

Figure 1:
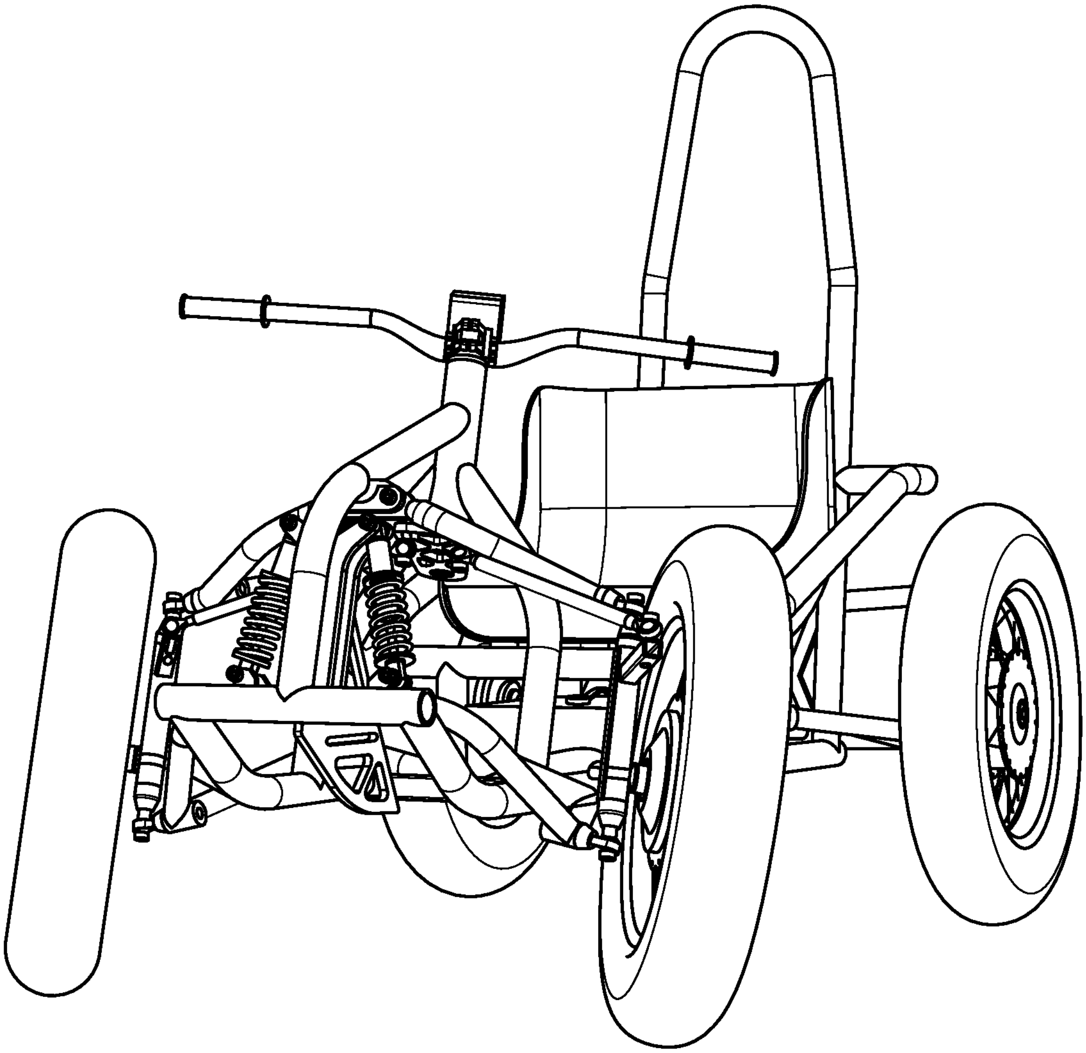
FIG. 1 shows an embodiment of the four-wheel driven, all-terrain vehicle seen aslant from ahead towards the left side of the vehicle.
Figure 2:
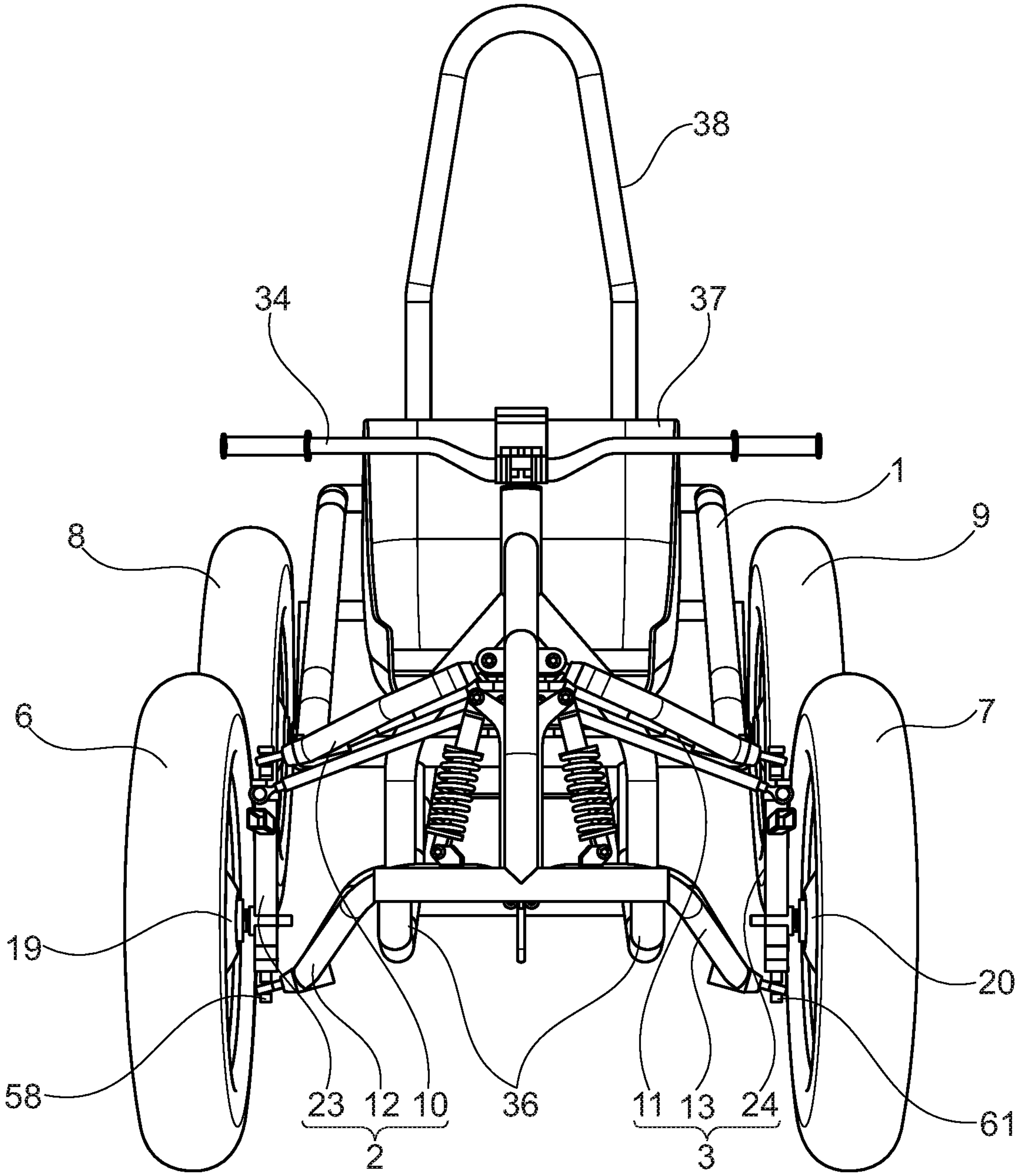
FIG. 2 shows an embodiment of the four-wheel driven, all-terrain vehicle seen from straight ahead.

FIG. 2 shows the four-wheel all-terrain vehicle seen straight ahead. Here the right front wheel suspension 2 is shown, where the right front wheel suspension 2 comprises right, upper, front control arm 10 which is connected to an uppermost part of the right, front link element 23 and where the right, lower, front control arm 12 is connected to a lowermost part on the right, front link element 23 and where the right, front link element is further attached to the right, front wheel hub 19 on the right front wheel 6. Here the left front wheel suspension 3 is shown comprising left, upper, front control arm 11 which is connected to an uppermost part of the left, front link element 24 and where the left, lower, front control arm 13 is connected to a lowermost part on the left, front link element 24 and where the left, front link element is further attached to the left, front wheel hub 20 on the left front wheel 7.

The figure also shows how the lower, front control arms 12, 13 are shaped as curved A-arms, where the lower, front curved A-arms extend substantially horizontally from about the longitudinal centre line of the frame 1 and out over the outer pipe elements 36 of the frame 1 and down to the right, lower joint connecting connections 58, 61 at a lowermost part of the front link elements 23, 24.

The figure further shows an embodiment of the roll bar 38 of the vehicle which is arranged behind the seat 37 and which will extend above the head of the driver such that it protects the driver in an overturn. The figure shows an embodiment of the steering device 34 provided with a display which can show for example a map, speed, battery status etc. The figure further shows that all wheels 6, 7, 8, 9 are provided with over-dimensioned tyres (fat-bike wheels).

Figure 3:
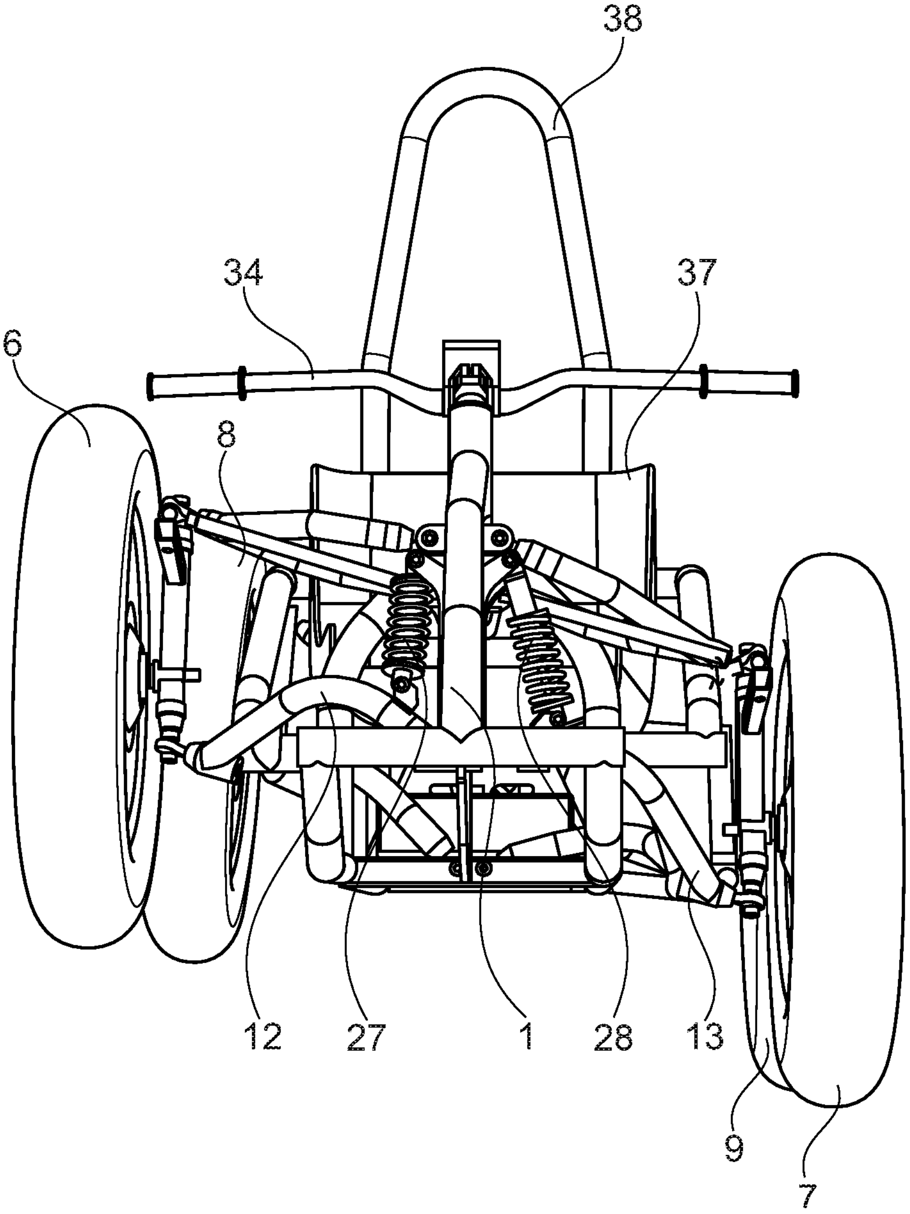
FIG. 3 shows an embodiment of the four-wheel driven, all-terrain vehicle where the damping device is contracted on the right side and extended on the left side of the vehicle.

FIG. 3 shows the four-wheel driven all-terrain vehicle where the damping device is contracted on the right side and extended on the left side. The figure shows the right front wheel 6 with its contracted damping device 27 and the left front wheel 7 with its extended damping device 28. The figure further shows how the right, front damping device 27 and the left, front damping device 28 are attached to the right, lower, front control arm 12 and the left, lower, front control arm 13 and to the frame 1 with link elements. FIG. 3 clearly shows how the right, lower, front control arm 12 with its curved shape (A-arm) is in a raised position over the ground without coming into conflict with the frame 1 and how the left, lower, front control arm 13 with its curved shape extend in an arc above the outer edge pipe element of the frame 1 and down passed the frame 1. The curved geometry of the lower, front control arms make up a better springing capacity for the front wheel suspensions and they provide a better ground clearance for the frame 1.

The figure further shows an embodiment of the roll bar 38 of the vehicle which is arranged behind the seat 37 and which will extend above the head of the driver such that it will protect the driver in an overturn. The figure also shows the steering device 34 provided with a display which can show for example a map, gps position, speed, battery status etc. The figure further shows that all wheels 6, 7, 8, 9 are provided with over-dimensioned tyres (fat-bike wheels).

Figure 4:
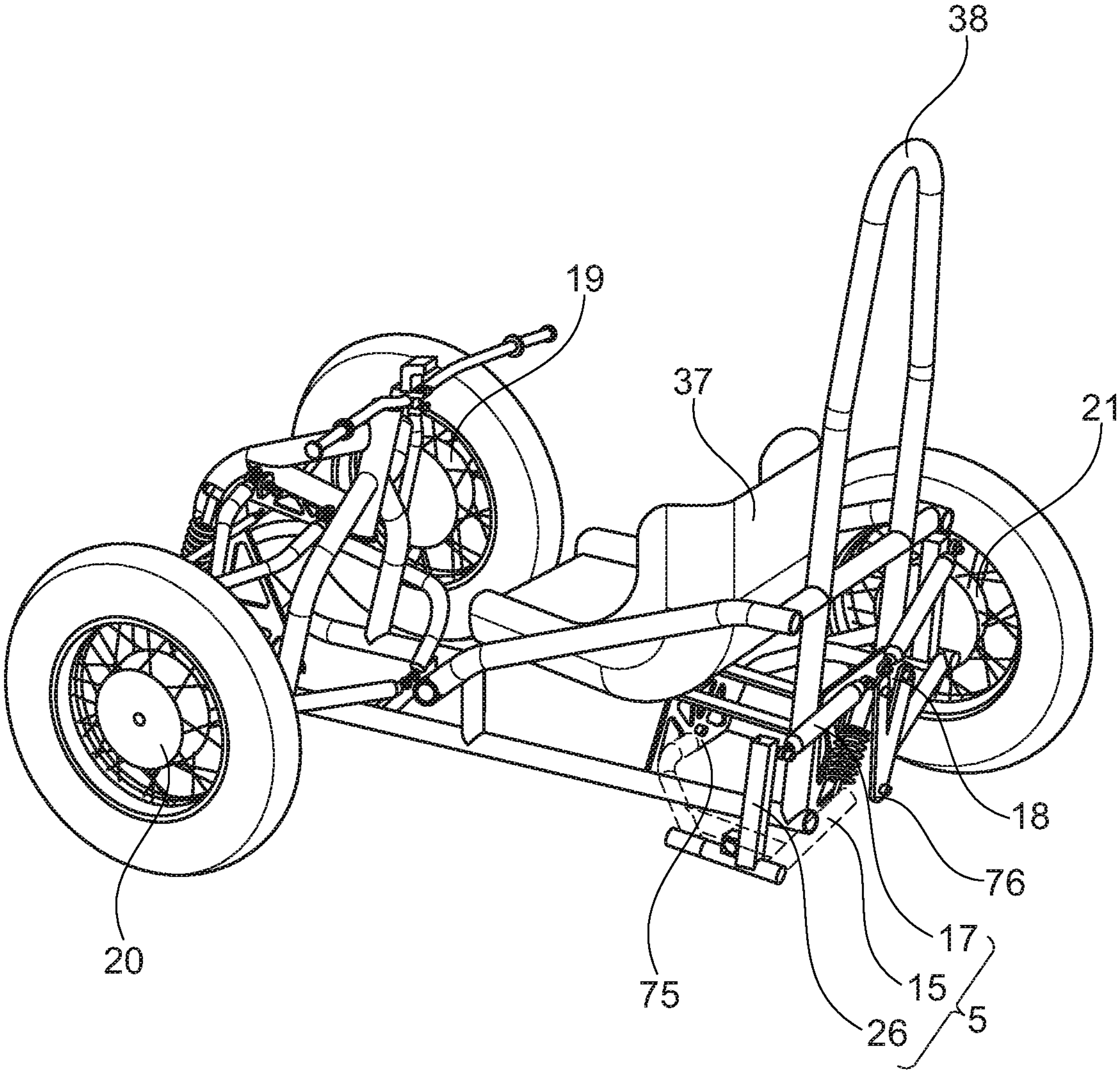
FIG. 4 shows an embodiment of the four-wheel driven, all-terrain vehicle without left rear wheel seen aslant from the rear towards the left side of the vehicle.

FIG. 4 shows the four-wheel driven all-terrain vehicle seen aslant from behind from its left side without left rear wheel. The figure shows an embodiment of the left, rear wheel suspension 5 comprising left, upper camber link 17, and left, rear link element 26, and left, lower, rear control arm 15, and where left, upper camber link 17 is attached to a bracket device 18. The figure further shows how left, lower, rear control arm 15 is attached approximately to the frame 1 at the longitudinal centre line to obtain as long a control arm as possible without increasing the width of the vehicle.

The figure also shows left, rear, lower, rear connecting connection 75 and left, rear, lower, front connecting connection 76, both preferably ball joint couplings, but may alternatively be a pivot joints, ball-and-socket joints, link couplings other suitable devices for the left, lower, rear control arm 15 to the frame 1. It is clearly shown that there is a give distance between them in the longitudinal direction, preferably 250 mm, but this may adjusted depending on the position of the seat 37. It is also conceivable that the connecting connection 75 is arranged in front of the seat (not shown here). The connecting connections 75, 76 are preferably ball joint couplings, but may alternatively be a pivot joint, ball-and-socket joint, link coupling or another suitable connection. The figure further shows the roll bar 38 and how it is an extension of the frame 1.

Figure 5:
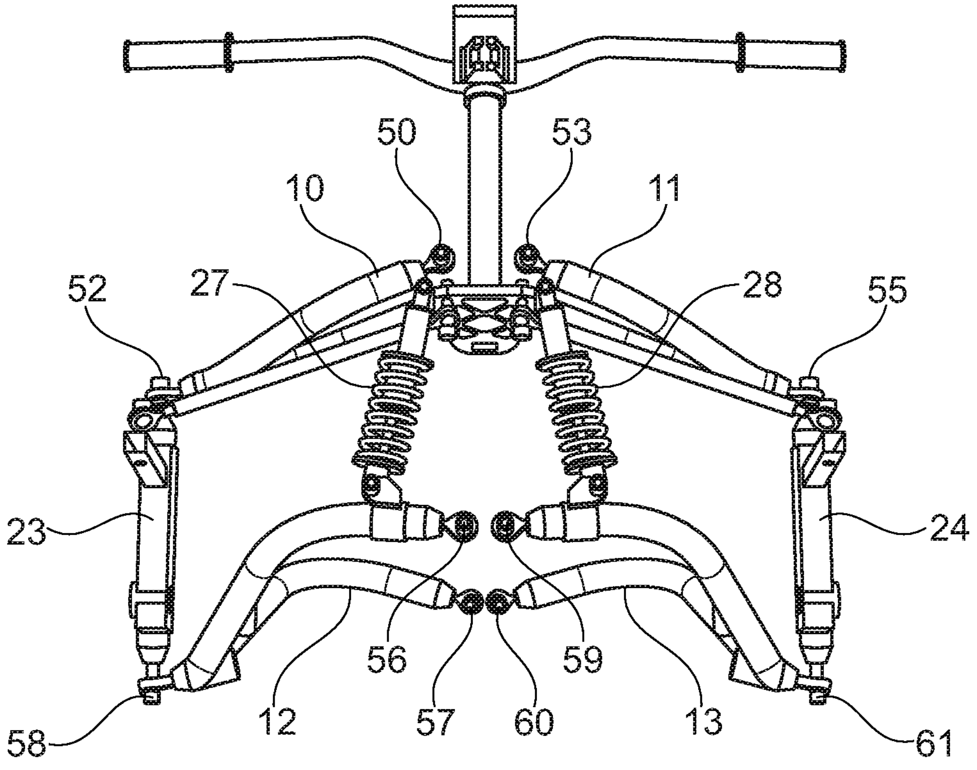
FIG. 5 shows an embodiment of the four-wheel driven, all-terrain vehicle's front wheel suspensions.

FIG. 5 shows the front wheel suspensions the vehicle. The figure clearly shows that the lower, front, control arms 12 and 13 are shaped as curved A-arms. The curved A-arms extend substantially horizontally from their respective connecting connections 56, 57, 59 and 60 on the frame 1 until they curve downwards over the outer pipe elements of the frame 1 and down to their respective connecting connections 58, 61. The lower, front control arms 12 and 13 are connected to their respective connecting connections 56, 57, 59 and 60 to the frame 1, which is preferably ball joint couplings, but may also be a pivot joints, ball-and-socket joints, link couplings or another type of suitable connections, and to their connecting connections 58, 61 which preferably are ball joint coupling, but may also be a pivot joints, ball-and-socket joints, link couplings or another type of suitable connection, to their link elements 23 and 24.

The figure shows the front damping devices 26 and 27 and how they preferably are connected between the lower, front control arms 12 and 13 and the frame 1. The figure also shows the upper, front control arms 10 and 11 and how they preferably are connected to the frame 1 and to their respective link elements 23 and 24, and from there further connected together with their lower, front control arms 12 and 13. The figure shows the connecting connections which preferably are ball joint coupling, but may also be a pivot joints, ball-and-socket joints, link couplings or another type of suitable connection, for the upper control arms 10, 11, 12 and 13 where the front connecting connections 50, 53, 56 and 59 are located vertically higher than the rear connecting connections 51, 54, 57 and 60.

Figure 6:
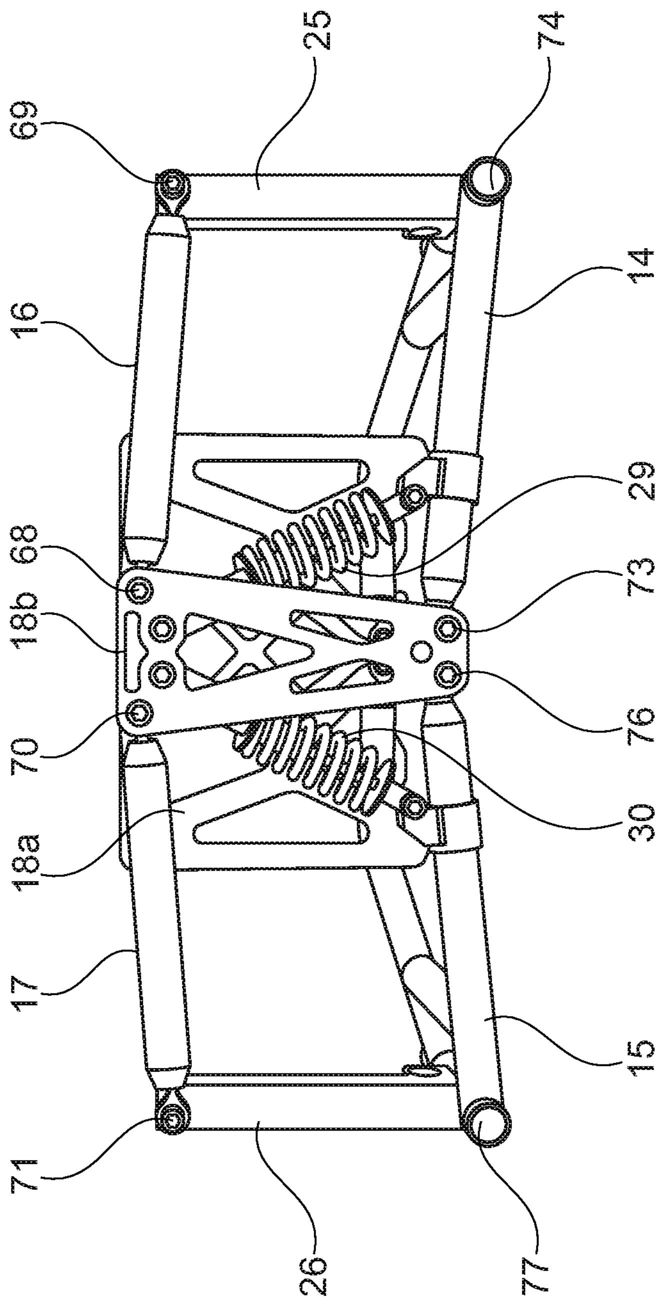
FIG. 6 shows an embodiment of the four-wheel driven, all-terrain vehicle's rear wheel suspensions, seen from behind.

FIG. 6 shows the four-wheel driven, all-terrain vehicle with its rear wheel suspensions, seen from behind. The figure shows the bracket device 18, which is here shown in two parts, a bracket-a 18*a* in front of the connecting connections and a bracket-b 18*b* behind. This is to strengthen the connecting connections which are preferably a link coupling, but may also be a ball joint coupling, pivot joint, ball-and-socket joint or another type of suitable connection.

There is further shown an embodiment of the camber links 16 and 17 and how they are connected with their connecting connections 68 and 70, here shown as link coupling, to the bracket device 18 and their connecting connections 69 and 71, here shown as ball joint coupling, but may also be a link coupling, pivot joint, ball-and-socket joint or other suitable connections, to their link elements 25 and 26. Further, the lower, rear control arms 14 and 15 are connected with their connecting connections 74 and 77, here shown as link connections that rotate about an axis, to their connecting connections 25 and 26 and are thereby connected to the upper camber links 16 and 17. Further, the lower, rear control arms 14 and 15 are connected to the bracket device 18 via the connecting connections 73 and 76, here shown as link coupling. The figure further shows a right, rear damping device 28 and a left, rear damping device 29 which are attached to each lower, rear control arm 14 and 15 and to the bracket device 18. The damping devices 28, 29 may function as both springing and damping for the rear suspensions 4 and 5.

Figure 7:
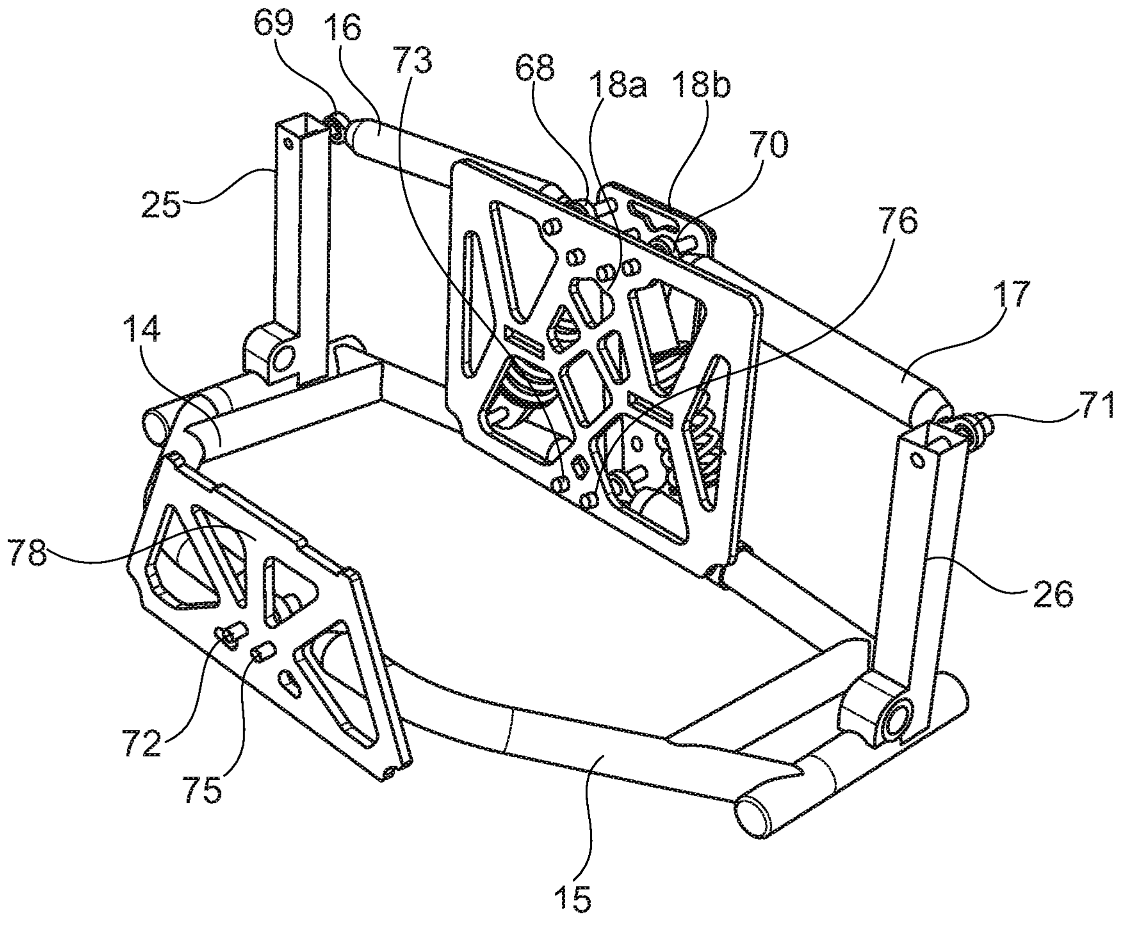
FIG. 7 shows an embodiment of the four-wheel driven, all-terrain vehicle's rear wheel suspensions, seen aslant from the front.

FIG. 7 shows the four-wheel driven, all-terrain vehicle's rear wheel suspensions, seen aslant from the front. The figure shows how the lower, rear control arms 14 and 15 are connected to the lower, rear link arm bracket 78 with their connecting connections 72 and 75, which preferably a link couplings, but may also be ball joint couplings, ball-and-socket joint, pivot joint or another type of suitable connection, and to bracket device 18 with their connecting connections 73 and 76, which preferably are link couplings, but may also be ball joint couplings, ball-and-socket joint, pivot joint or another type of suitable connections, near the longitudinal centre line of the vehicle.

The figure also shows the bracket device 18 with its two parts, a front bracket 18*a* and a rear bracket 18*b*. The figure shows the upper camber links 16 and 17 with their respective connecting connections 69 and 71, here shown as ball joint couplings, but may alternatively be link couplings, ball-and-socket joints, pivot joints or other suitable connections, which are connected with their respective link connections 25 and 26.

Figure 8:
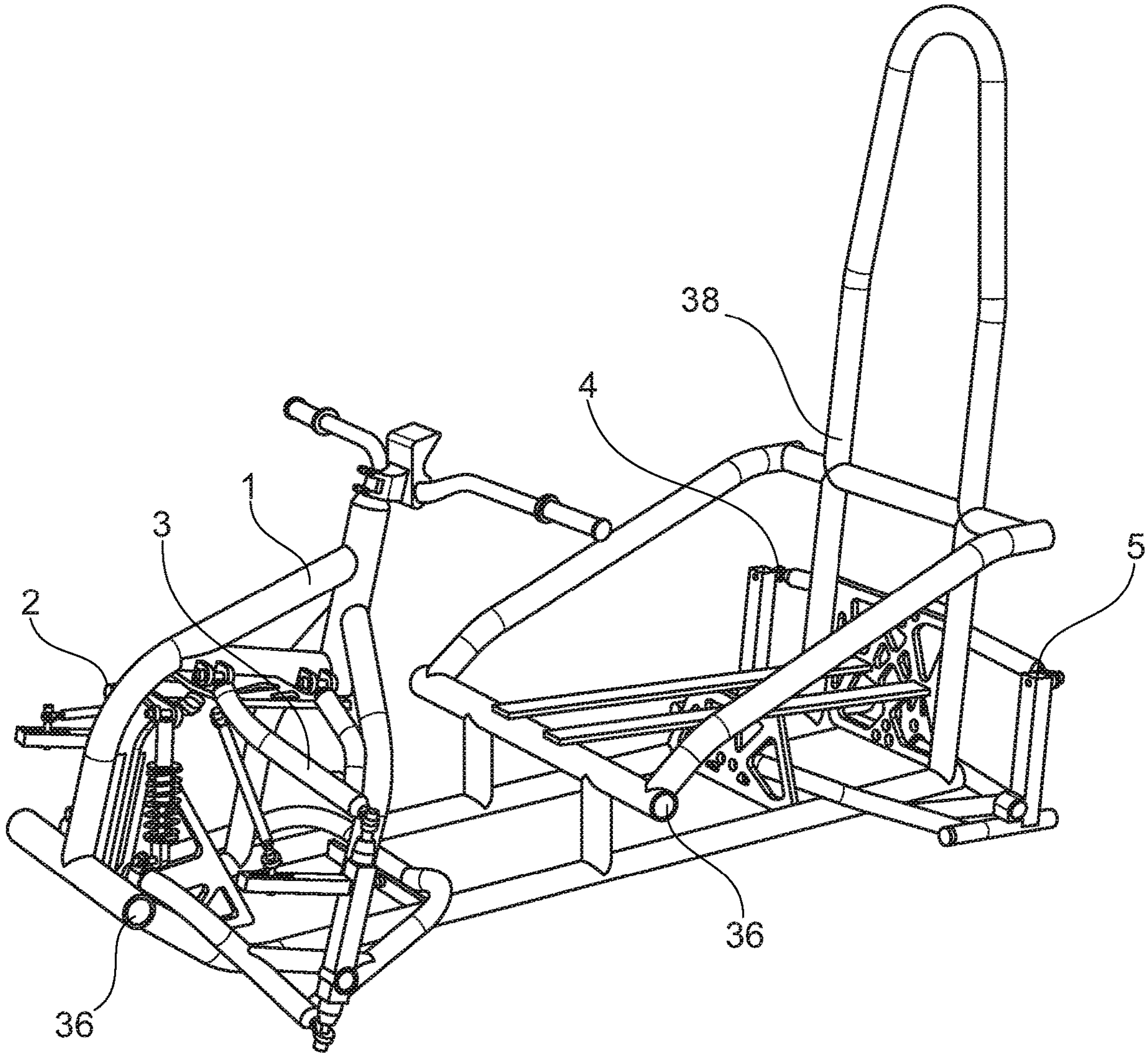
FIG. 8 shows an embodiment of the four-wheel driven, all-terrain vehicle's frame with rear wheel suspensions and front wheel suspensions.

FIG. 8 shows the four-wheel driven, all-terrain vehicle's frame with its frame 1 with rear wheel suspensions and front wheel suspensions. The figure shows the frame 1 formed by pipe elements 36 which preferably have a circular cross-section, but the pipe elements 36 may also have a cross-section which is rectangular, triangular, square, oval or another shape of the cross-section. The figure clearly shows that the positions of the attachments for all the control arms and camber links are approximately at the longitudinal centre line of the frame 1, such that the control arms for the wheel suspensions 2, 3, 4 and 5 are as long as the frame geometry allows when the wheels are arranged as close to the frame 1 as practically possible such that the width of the vehicle does not exceed the requirements for the outer dimensions that are defined for a wheel chair in many countries.

The figure clearly shows how the frame's 1 front part is formed with a frame as a fork down on each side of the foot-/leg placement and in front of the foot placement. The figure shows the substantially horizontal upper, front control arms which are arranged above the foot-/leg placement of the driver and the substantially vertical steering column ends in the steering bracket in a position above the foot-/leg position of the driver, and where the substantially horizontal tie rods are arranged above the foot-/leg position of the driver. Such a geometry of the frame 1 affects the maximum length of the vehicle such that the length of the vehicle does not exceed the requirements for the outer dimensions which are defined for wheel chairs in many countries.

Figure 9:
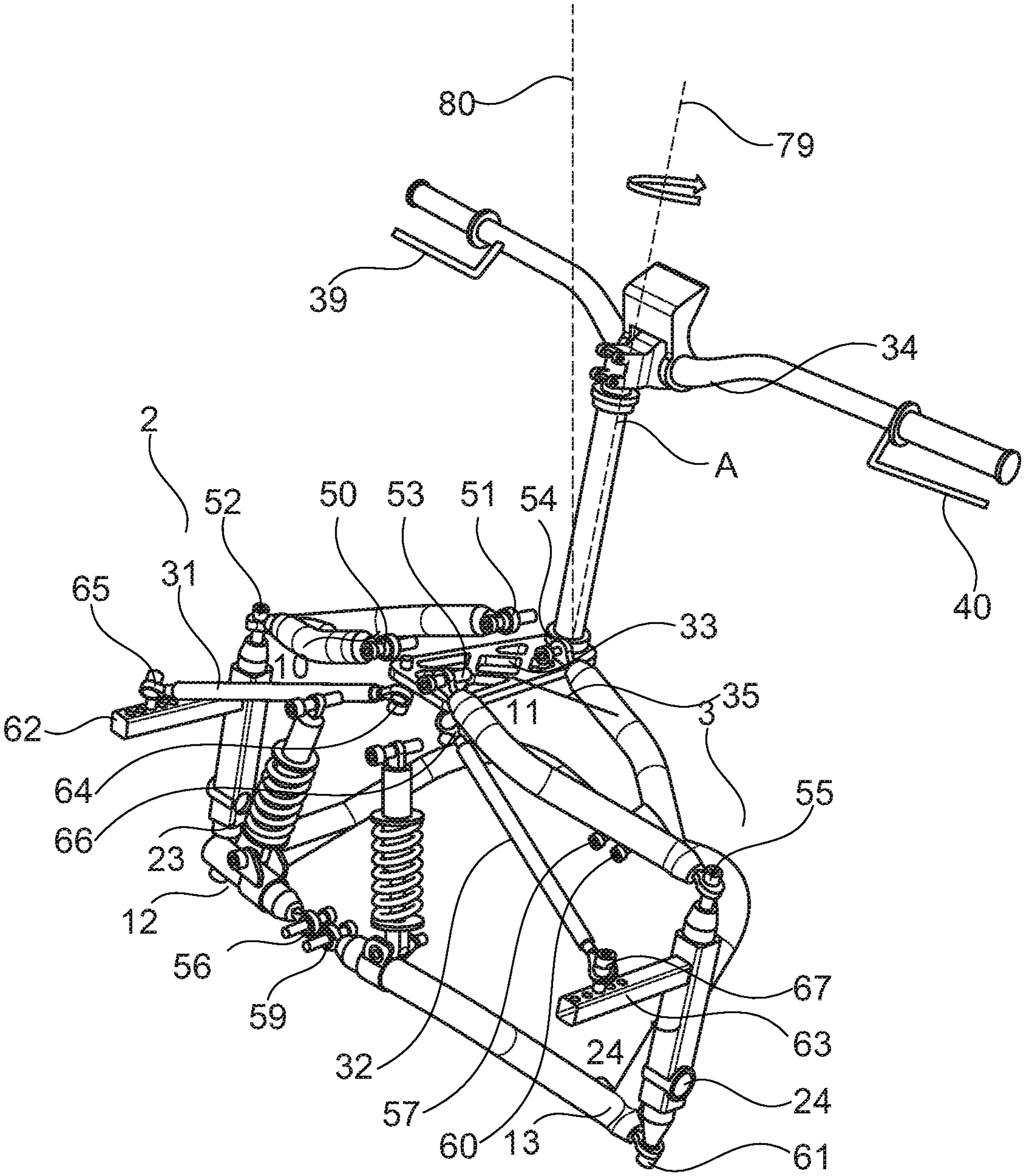
FIG. 9 shows an embodiment of the four-wheel driven, all-terrain vehicle's front wheel suspensions, steering device comprising steering column, steering bracket and tie rods and front damping device.

FIG. 9 shows the four-wheel driven, all-terrain vehicle's front wheel suspensions, its steering device comprising steering column, steering bracket and tie rods and front damping device. FIG. 9 shows the right front wheel suspension 2 which comprises a right, upper, front control arm 10 with two connecting connections 50 and 51 to the frame 1 and a connecting connection 52 to the right, front link element 23. Further, there is shown a right, lower, front control arm 12 with two connecting connections 56 and 57 to the frame 1 and a connecting connection 58 to the right, front link element 23. The right, upper, front control arm 10 and the right, lower, front control arm is thereby connected via the right, front link element 23. The left wheel suspension 3 comprises a left, upper, front control arm 11 with two connecting connections 53 and 54 to the frame 1 and a connecting connection 55 to the left, front link element 24. There is further shown a left, lower, front control arm 13 with two connecting connections 57 and 59 to the frame 1 and a connecting connection 61 to the left, front link element 24. The left, upper, front control arm 11 and left, lower, front control arm 13 is thereby connected via the left, front link element 24. The figure further shows that left and right tie rods 31 and 32 are connected with the steering bracket 33 which is further securely attached to the steering column (A). The figure also shows how the tie rods 31 and 32 are connected to the steering bracket 33 each with their tie rod bracket 62 and 63 via connecting connections 65 and 67. The figure further shows the steering device 34 with handle bars 39 and 40 on the right and left side respectively of the steering device, a steering column (A) the steering bracket 33 and position damping device 35. The position damping device is a device for the steering device to make it easier to keep the steering device stable in a given position. On impact or shock on the front wheels the position damping device will dampen the wheel fight which affects the direction and it will be easier for the driver to keep control of the steering. The position damping device also function as an end stop for the front wheels so that they don't come into conflict with the frame in a sharp curve.

The figure also shows the vertical axis 80 of the steering column and the longitudinal axis 79 of the steering column, where it is indicated a turning about the longitudinal axis of the steering column 79 where the steering device 34 keeps its substantially horizontal position on turning about the longitudinal axis 79 of the steering column since the longitudinal axis 79 of the steering column is just slightly tilted backwards towards the driver relative to the vertical axis 80 of the steering column. The steering device 34 will then not come into conflict with the legs of the driver on turning about the longitudinal axis 79 of the steering column. In order for the steering column (A) not to come into conflict with the legs of the driver, the steering column (A) is preferably attached to a steering bracket 33 in a vertical position on the frame 1 above the legs of the driver, and the steering bracket 33 is further connected to a right and a left tie rod 31 and 32 which are also arranged in a vertical position above the legs of the driver. The front control arms and the tie rods preferably have connecting connections which are ball joint couplings to both the frame 1 and the link elements 23 and 24, but may also be ball-and-socket joints, link couplings, pivot joints or other suitable connections.

Figure 10:
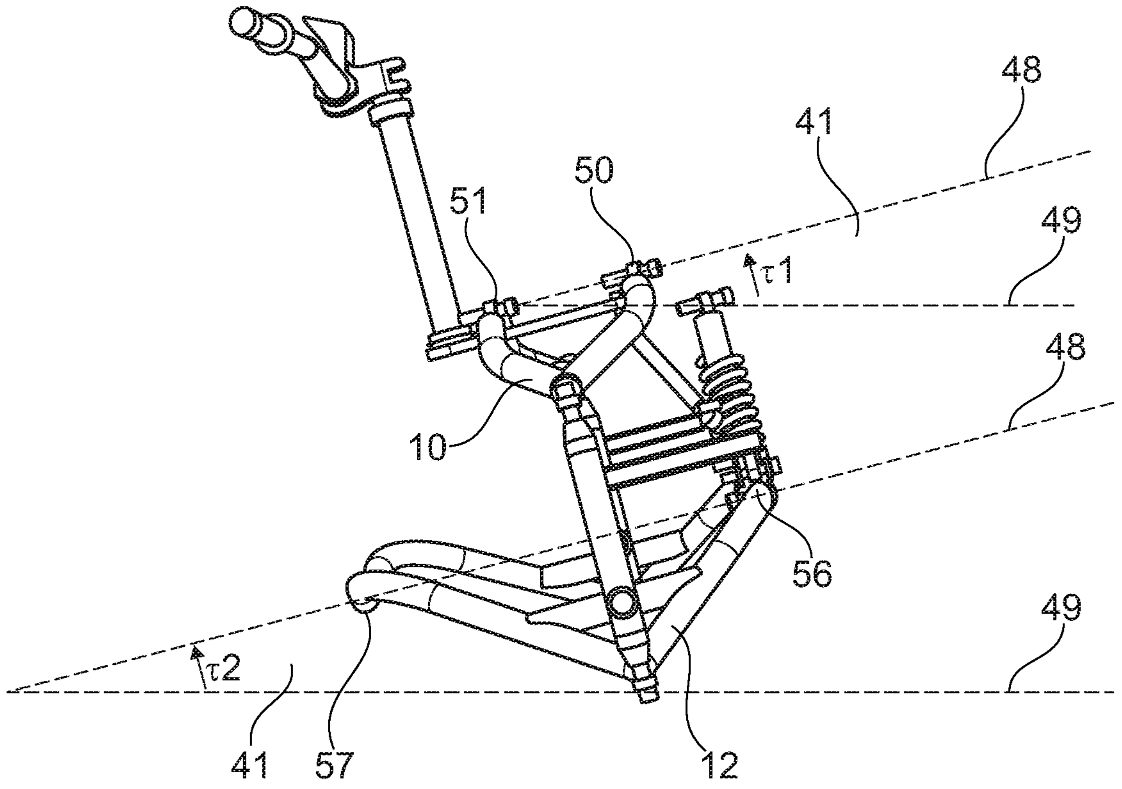
FIG. 10 shows an embodiment of the four-wheel driven, all-terrain vehicle's kick-up angle τ [°] on the upper, front, rear control arm.

FIG. 10 shows the four-wheel driven, all-terrain vehicle's kick-up angle τ [°] on the upper, front, rear control arm. The figure shows an embodiment of the kick-up angles τ1 and τ2 in degrees [°] 41, where τ1 is the kick-up angle for the right, upper, front control arm 10 and where τ2 is the kick-up angle for the right, lower, front control arm 12. The kick-up angle τ1 is the angle between the axis 48 which extends through the front connecting connection 50 and rear connecting connection 51 for the right, upper, front control arm 10 on the frame 1, against the horizontal plane 49, where the front connecting connection 50 on the frame 1 is arranged vertically higher than the rear connecting connection 51 such that an angle is formed that is larger than 0 degrees on the right, front, upper control arm 10. The kick-up angle τ2 is the angle between the axis 48 which extends through the front, lower connecting connection 56 and rear connecting connection 57 for the right, lower, front control arm 12 on the frame 1, against the horizontal plane 49, where the front, lower connecting connection 56 on the frame 1 is arranged vertically higher than the rear, lower connecting connection 57 such that an angle is formed that is larger than 0 degrees on the right, front, upper control arm 12. The kick-up angles τ1 and τ2 are preferably equal, with the same number of degrees [°], but they may also be different. The vehicle preferably has a kick-up angle of 15 degrees [°], but not less than 5 degrees [°].

Figure 11:
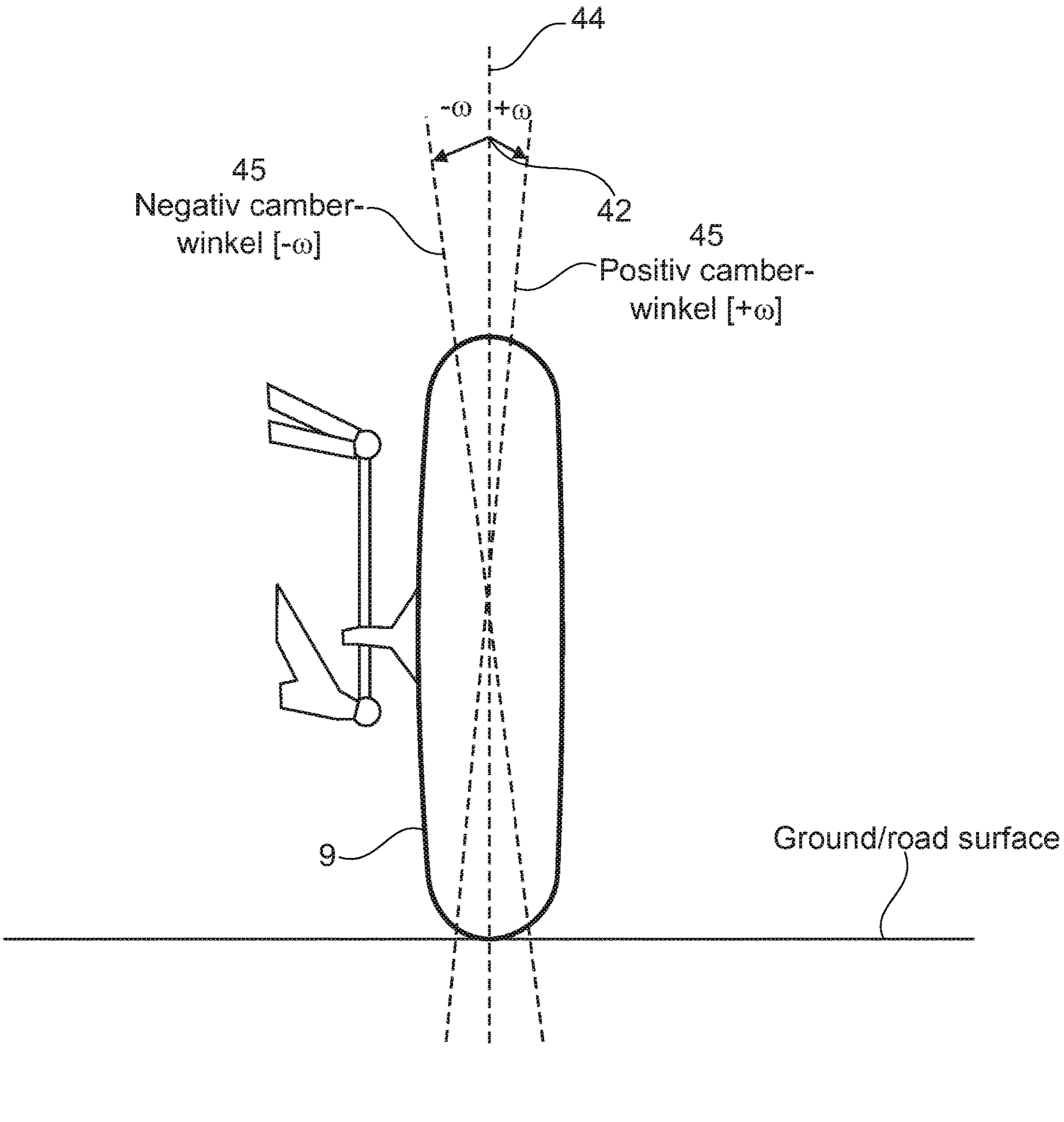
FIG. 11 shows an embodiment of the four-wheel driven, all-terrain vehicle's camber angle ω [°] seen straight from the front on the left rear wheel or seen straight from the rear on the right rear wheel.

FIG. 11 shows an illustration of the four-wheel driven, all-terrain vehicle's camber angle ω [°] seen straight from the front on the left rear wheel or seen straight from the rear on the right rear wheel. The figure shows the left rear wheel 9 seen from the front, where the camber angle 42 is defined as the difference from the vertical axis of the wheel. The rear wheel 9 has a negative camber angle when the top of the wheel 9 leans towards the frame 1 and a positive camber angle when the top of the wheel 9 leans away from the frame 1.

Figure 12:
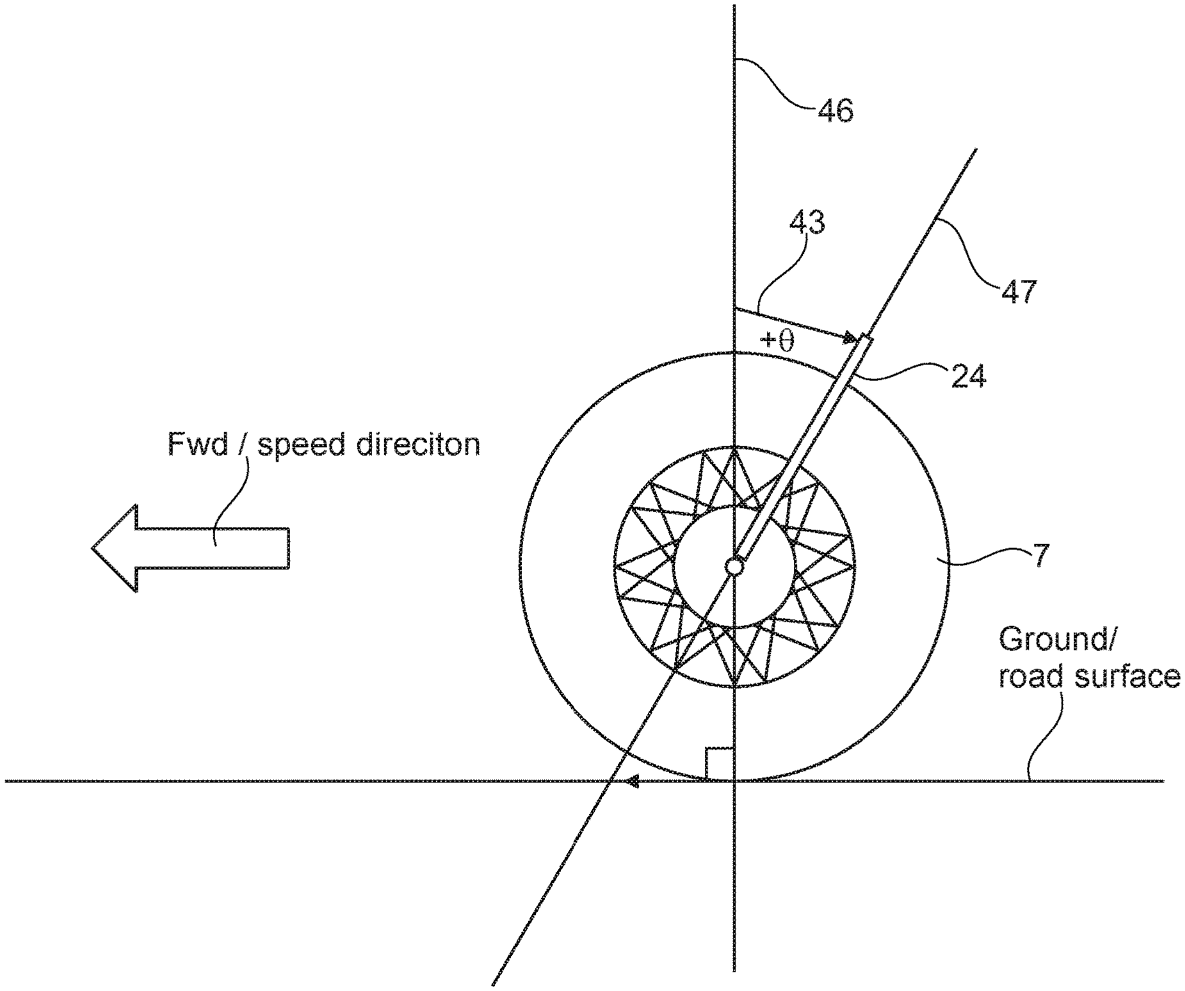
FIG. 12 shows an embodiment of the four-wheel driven, all-terrain vehicle's positive caster angle Θ [°] seen from the side and towards the vehicle, here shown on the left, front wheel.

FIG. 12 shows an illustration of the four-wheel driven, all-terrain vehicle's positive caster angle Θ [°] seen from the side and towards the vehicle, here shown on the left, front wheel 7, but the same principle applies to the right front wheel 6. The figure shows the caster angle 43 where the caster angle is defined as the angle between the angle between the longitudinal axis 47 of the link element 24 and the vertical axis 46 of the link element 24 and in the figure shown at the centre of the left front wheel 7. The caster angle is positive when the longitudinal axis 47 of the link element meets the road surface, or the ground, in front of the vertical axis of the link element 46, as shown in the figure. The caster angle 43 assists in balancing the steering and stability of the vehicle, and it assists in realigning the wheel after a curve.

Figure 13:
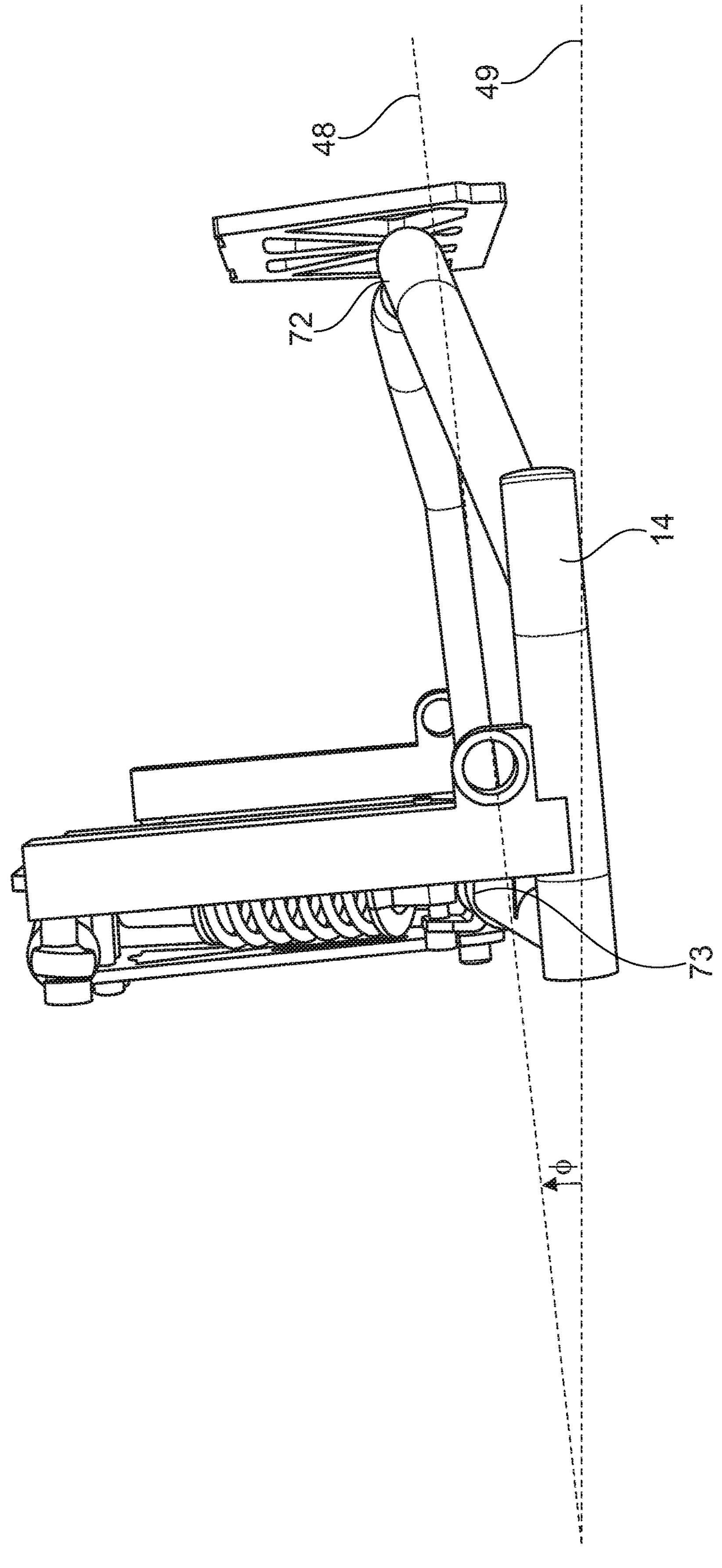
FIG. 13 shows an embodiment of the four-wheel driven, all-terrain vehicle's anti-squat with an angle ϕ [°] seen towards the right side of the rear wheel suspension.

FIG. 13 shows an embodiment of the four-wheel driven, all-terrain vehicle's anti-squat angle with an angle ϕ [°] seen towards the right side of the rear wheel suspension. The figure shows how the right, rear, lower, front connecting connection 72 is vertically higher connected to the frame 1 than the right, rear, lower, rear connecting connection 73 such that the right, lower, rear control arm 14 is inclined relative to a horizontal plane with an angle ¢. Such than angle ¢ larger than 0 degrees, between the lower, rear control arms 14 and 15 and a horizontal plane, is called for anti-squat on the technical language. The vehicle has an anti-squat angle of at least 2 degrees, preferably 5 degrees. The vehicle will then have a better grip on the front wheels in an acceleration which provides a better practicability in the terrain. The vehicle also has a better grip on the rear wheels when braking, with anti-squat, which again increases the safety of the driver.

| Ref. no. | Name: | Description: |
|---|---|---|
| 1 | Frame | — |
| 2 | Right front wheel suspension | — |
| 3 | Left front wheel suspension | — |
| 4 | Right rear wheel suspension | — |
| 5 | Left rear wheel suspension | — |
| 6 | Right front wheel | — |
| 7 | Left front wheel | — |
| 8 | Right rear wheel | — |
| 9 | Left rear wheel | — |
| 10 | Right, upper, front control arm | Support arm, or control arm, shaped as an A, called an A-arm |
| 11 | Left, upper, front control arm | Support arm, or control arm, shaped as an A, called an A-arm |
| 12 | Right, lower, front control arm | Support arm, or control arm, shaped as an arched A, called arched A-arm |
| 13 | Left, lower, front control arm | Support arm, or control arm, shaped as an arched A, called arched A-arm |
| 14 | Right, lower, rear control arm | Support arm, or control arm, shaped as an A, called an A-arm |

-continued

| Ref. no. | Name: | Description: |
|---|---|---|
| 15 | Left, lower, rear control arm | Support arm, or control arm, shaped as an A, called an A-arm |
| 16 | Right, upper camber link | |
| 17 | Left, upper camber link | |
| 18 | Bracket device | Comprises two brackets, a front bracket a and a rear bracket b |
| 19 | Right, front wheel hub | |
| 20 | Left, front wheel hub | |
| 21 | Right, rear wheel hub | |
| 22 | Left, rear wheel hub | |
| 23 | Right, front link element | |
| 24 | Left, front link element | |
| 25 | Right, rear link element | |
| 26 | Left, rear link element | |
| 27 | Right, front damping device | |
| 28 | Left, front damping device | |
| 29 | Right, rear damping device | |
| 30 | Left, rear damping device | |
| A | Steering column | |
| 31 | Right tie rod | |
| 32 | Left tie rod | |
| 33 | Steering bracket | |
| 34 | Steering device | Handlebars, steering wheel, joystick etc. |
| 35 | Position damping device | |
| 36 | Pipe element | |
| 37 | Seat | |
| 38 | Roll bar | |
| 39 | Right handle | Front brake |
| 40 | Left handle | Rear brake |
| 41 | Kick-up angle $\tau$ [°] | |
| 42 | Camber angle $\omega$ [°] | |
| 43 | Caster angle $\Theta$ [°] | |
| 44 | Vertical axis of the wheel | |
| 45 | Centre axis of the wheel Hjulets senterakse | |
| 46 | Vertical axis of the link element | |
| 47 | Longitudinal axis of the link element | Can also be called the steering axis of the front wheels |
| 48 | Kick-up longitudinal axis | |
| 49 | Horizontal plane | |
| 50 | Right, upper, front connecting connection | Front, connecting connection between right, upper control arm 10 to the frame 1. |
| 51 | Right, upper, rear connecting connection | Rear, connecting connection between right, upper control arm 10 to the frame 1 |
| 52 | Right, upper, joint connecting connection | Connecting connection between right, upper, front control arm 10 to right, front link element 23 |
| 53 | Left, upper, front connecting connection | Front, connecting connection between left, upper, control arm 11 to the frame 1 |
| 54 | Left, upper, rear connecting connection | Rear, connecting connection between left, upper, control arm 11 to the frame 1 |
| 55 | Left, upper joint connecting connection | Connecting connection between left, upper, front control arm 11 to left, front link element 24 |
| 56 | Right, lower, front connecting connection | Front, connecting connection between right, lower, control arm 12 to the frame 1 |
| 57 | Right, lower, rear connecting connection | Rear, connecting connection between right upper control arm 12 to the frame 1 |
| 58 | Right, lower, joint connecting connection | Connecting connection between right, lower, front control arm 12 to right, front link element 23 |
| 59 | Left, lower, front connecting connection | Front, connecting connection between left, lower control arm 13 to the frame 1 |
| 60 | Left, lower, rear connecting connection | Rear, connecting connection between right, upper control arm 13 to left, front |
| 61 | Left, lower, joint connecting connection | Connecting connection between right, lower, front control arm 13 to left, front link element 24 |
| 62 | Right tie rod bracket | — |
| 63 | Left tie rod bracket | — |
| 64 | Right, inner tie rod connecting connection | Connecting connection between right tie rod 31 and steering bracket 33 |
| 65 | Right, outer tie rod connecting connection | Connecting connection between right tie rod 31 and right tie rod bracket 62 |
| 66 | Left, inner tie rod connecting connection | Connecting connection between left tie rod 32 and steering bracket 33 |

-continued

| Ref. no. | Name: | Description: |
|---|---|---|
| 67 | Left, outer tie rod connecting connection | Connecting connection between left tie rod 32 and right tie rod bracket 63 |
| 68 | Right, inner camber connecting connection | Connecting connection between right camber link 16 and bracket device 18 |
| 69 | Right, outer camber connecting connection | Connecting connection between right camber link 16 and right, rear link element 25 |
| 70 | Left, inner camber connecting connection | Connecting connection between left camber link 17 and the bracket device 18 |
| 71 | Left, outer camber connecting connection | Connecting connection between left camber link 17 and right, rear link element 25 |
| 72 | Right, rear, lower, front connecting connection | Front connecting connection to the frame 1 for right, lower, rear control arm 14 |
| 73 | Right, rear, lower, rear connecting connection | Rear connecting connection to the frame 1 for right, lower, rear control arm 14 |
| 74 | Right, rear, lower joint connecting connection | Connecting connection between right, lower, rear control arm to the right, rear link element 25 |
| 75 | Left, rear, lower, rear connecting connection | Front connecting connection to the frame 1 for the right, lower, rear control arm 14 |
| 76 | Left, rear, lower, front connecting connection | Rear connecting connection to the frame 1 for right, lower, rear link arm 15 |
| 77 | Left, rear, lower joint connecting connection | Connecting connection between left, lower, rear link arm 15 to the left, rear link element 26 |
| 78 | Lower, rear link arm bracket | |
| 79 | Longitudinal axis of steering column | |
| 80 | Vertical axis of steering column | |

The invention claimed is:

1. A four-wheel driven vehicle, comprising:

a bracket device (18); and a frame (1) comprising:

a right front wheel suspension (2) with a right front wheel (6) and a left front wheel suspension (3) with a left front wheel (7); and a right rear wheel suspension (4) with a right rear wheel (8) and a left rear wheel suspension (5) with a left rear wheel (9), wherein the right front wheel suspension (2) comprises a right, upper, front control arm (10) shaped as an A-arm and connected to the frame (1) with a right, upper, front connecting connection (50) and a right, upper, rear connecting connection (51), the right front wheel suspension (2) further comprises a right, lower, front control arm (12) shaped as a curved A-arm and connected to the frame (1) with a right, lower, front connecting connection (56) and a right, lower, rear connecting connection (57), the left front wheel suspension (3) comprises a left, upper, front control arm (11) shaped as an A-arm and connected to the frame (1) with a left, upper, front connecting connection (53) and a left, upper, rear connecting connection (54), the left front wheel suspension (3) further comprises a left, lower, front control arm (13) shaped as a curved A-arm and connected to the frame (1) with a left, lower, front connecting connection (59) and a left, lower, rear connecting connection (60), the right, upper, front connecting connection (50) is connected to the frame (1) vertically higher than the right, upper, rear connecting connection (51) such that the right, upper, front control arm (10) is inclined relative to a horizontal plane, the right, lower, front connecting connection (56) is connected to the frame (1) vertically higher than the right, lower, rear connecting connection (57) such that the right, lower, front control arm (12) is inclined relative to the horizontal plane, the left, upper, front connecting connection (53) is connected to the frame (1) vertically higher than the left, upper, rear connecting connection (54) such that the left, upper, front control arm (11) is inclined relative to the horizontal plane, the left, lower, front connecting connection (59) is connected to the frame (1) vertically higher than the left, lower, rear connecting connection (60) such that the left, lower, front control arm (13) is inclined relative to the horizontal plane, and the right, lower, front control arm (12) extends from the right, lower, front connecting connection (56) and the right, lower, rear, connecting connection (57) substantially horizontally and curves in an arc over and downward past pipe elements of the frame (1), and the left, lower, front control arm (13) extends from the left, lower, front connecting connection (59) and the left, lower, rear connecting connection (60) substantially horizontally and curves in an arc over and downward past pipe elements of the frame (1).

2. The four-wheel driven vehicle according to claim 1, wherein:

the right rear wheel suspension (4) comprises a right, lower, rear control arm (14) shaped as an A-arm and a right, upper camber link (16), the right, upper camber link (16) extending between and being connected to the bracket device (18) and a right, rear, link element (25), and the left rear wheel suspension (5) comprises a left, lower, rear control arm (15) shaped as an A-arm and a left, upper camber link (17), the left, upper camber link (17) extending between and being connected to the bracket device (18) and a left, rear, link element (26).

3. The four-wheel driven vehicle according to claim 2, wherein:

the right, lower, rear control arm (14) is connected to the frame (1) with a right, rear, lower, front connecting connection (72) and a right, rear, lower, rear connecting connection (73), and the right, rear, lower, front connecting connection (72) is connected to the frame (1) vertically higher than the right, rear, lower, rear connecting connection (73), such that the right, lower, rear control arm (14) is inclined relative to the horizontal plane, the left, lower, rear control arm (15) is connected to the frame (1) with a left, rear, lower, front connecting connection (75) and a left, rear, lower, rear connecting connection (76), and the left, rear, lower, front connecting connection (75) is connected to the frame (1) vertically higher than the left, rear, lower, rear connecting connection (76), such that the left, lower, rear control arm (15) is inclined relative to the horizontal plane.

4. The four-wheel driven vehicle according to claim 2, wherein the right, upper camber link (16) and the left, upper camber link (17) are adjustable for individual adjustment of a camber angle (42).

5. The four-wheel driven vehicle according to claim 2, wherein the right rear wheel suspension (4) has a right, rear damping device (29) which is attached to the bracket device (18) and the right, lower, rear control arm (14), and the left rear wheel suspension (5) has a left, rear damping device (30) which is attached to the bracket device (18) and the left, lower, rear control arm (15).

6. The four-wheel driven vehicle according to claim 1, wherein:

the right, upper, front control arm (10) and the right, lower, front control arm (12) are connected to a right, front link element (23) which is further connected to a right, front wheel hub (19) and a longitudinal axis (47) of the right, front link element (23) forms a first positive caster angle, and the left, upper, front control arm (11) and the left, lower, front control arm (13) are connected to a left, front link element (24) which is further connected to a left, front wheel hub (20) and the longitudinal axis (47) of the left, front link element forms a second positive caster angle.

7. The four-wheel driven vehicle according to claim 1, wherein the right front wheel suspension (2) is provided with a right, front damping device (27) and the left front wheel suspension (3) is provided with a left, front damping device (28), the right, front damping device (27) is attached to the frame (1) and to either the right, upper, front control arm (10) or the right, lower, front control arm (12), and the left, front damping device (28) is attached to the frame (1) and to either the left, upper, front control arm (11) or the left, lower, front control arm (13).

8. The four-wheel driven vehicle according to claim 1, wherein each of the right front wheel (6) and left front wheel (7) is provided with a respective propulsion device for individual drive of the respective front wheel (6, 7), and each of the right rear wheel (8) and left rear wheel (9) is provided with a respective propulsion device for individual drive of the respective back wheel (8, 9).

9. The four-wheel driven vehicle according to claim 1, wherein a steering column (A) is arranged in a substantially vertical position and is connected to the frame (1) above a position of legs of a driver, and a steering bracket (33) is connected to the steering column (A) and a position damping device (35) is connected to the frame (1) and the steering bracket (33).

10. The four-wheel driven vehicle according to claim 9, comprising a right tie rod (31) connected between the steering bracket (33) and a right tie rod bracket (62), and a left tie rod (32) connected between the steering bracket (33) and a left tie rod bracket (63), wherein the right tie rod (31) and left tie rod (32) are arranged in a substantially horizontal position above a leg position of the driver.

11. The four-wheel driven vehicle according to claim 9, wherein the steering column (A) is substantially vertically arranged or inclined backward towards the driver when the vehicle is arranged on a horizontal ground such that a steering device (34) is arranged in a plane that is substantially horizontal when the steering device (34) is turned about a longitudinal axis (52) of the steering column.

12. The four-wheel driven vehicle according to claim 1, wherein the frame (1) is made of pipe elements (36) and is designed such that the pipe elements (36) can be used as a grab handle during transfer in and out of a seat (37).

13. The four-wheel driven vehicle according to claim 1, wherein the vehicle is a wheel chair.

14. The four-wheel driven vehicle according to claim 1, wherein the vehicle is an electric vehicle.

15. The four-wheel driven vehicle according to claim 1, wherein the left, lower, front control arm (13) extends to a connecting connection (58) on a lower part of a right, front, link element (23) and the left, lower, front control arm (13) extends to a connecting connection (61) on a lower part of a left, front, link element (24).

* * * * *